Nov. 22, 1938.  E. S. HALL  2,137,487
BEARING
Filed March 4, 1936
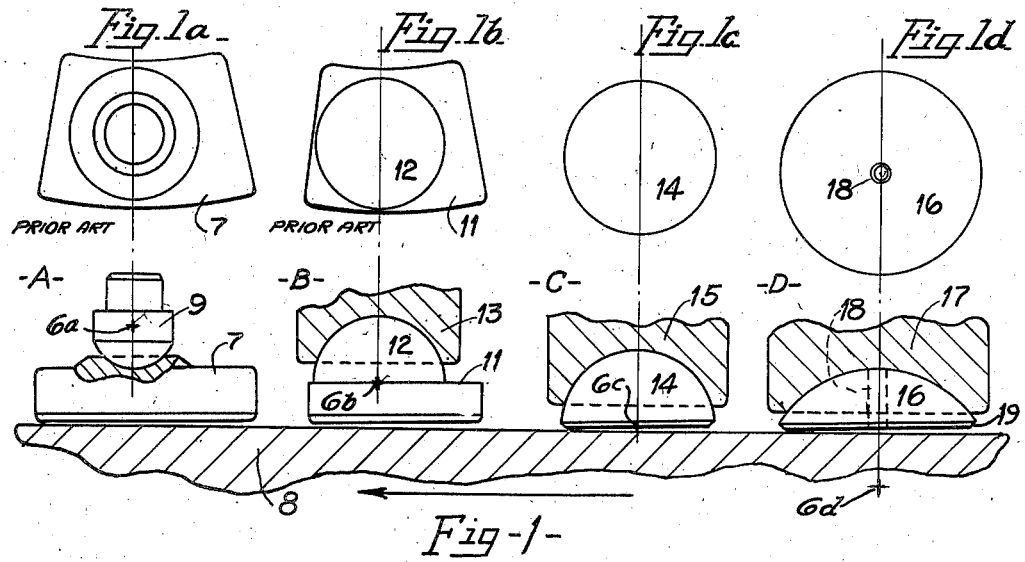
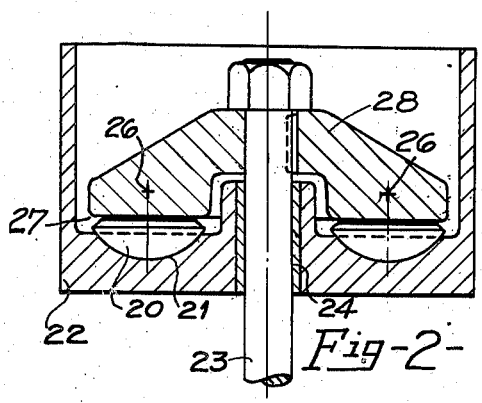
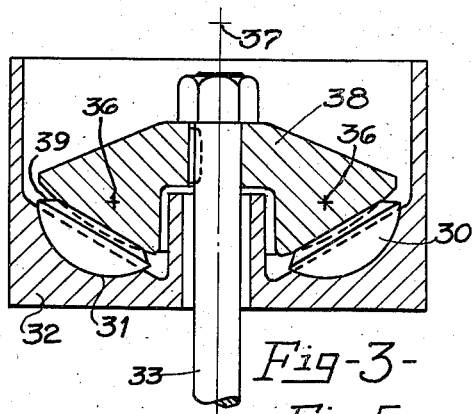
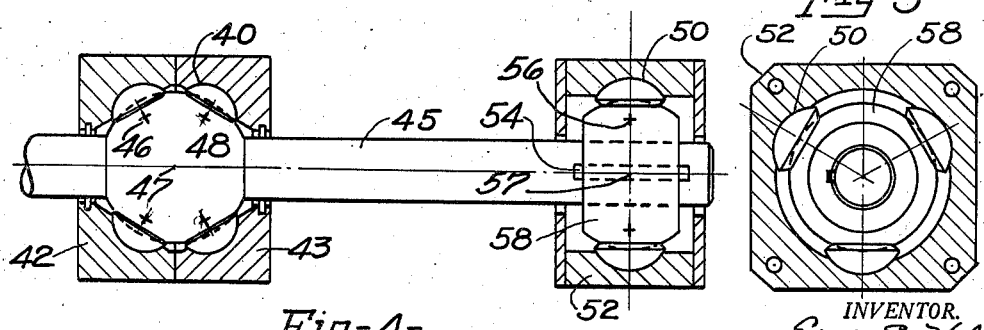
INVENTOR.
Edwin S. Hall.
BY
ATTORNEYS.

Patented Nov. 22, 1938

2,137,487

UNITED STATES PATENT OFFICE 2,137,487

BEARING

Edwin S. Hall, New Haven, Conn.

Application March 4, 1936, Serial No. 67,015

10 Claims. (Cl. 308—73)

This invention relates to bearings of the pivoted slipper type for radial, thrust, or combined radio-thrust loading.

In well-known types of pivoted slipper bearings, each slipper is mounted in such a way that it can tilt freely to permit the formation of a wedge-shaped film of lubricant between its working face and that of the runner. Usually, to assist in the formation of the lubricant film, the slipper is eccentrically loaded, i. e. the point of application of the load is behind the center of the working face, in the direction of runner motion. Such a bearing is essentially a one-way unit; it runs very efficiently forward, but only with reduced efficiency in reverse. Moreover, the eccentrically loaded slippers, since they run with their longer ends forward, have a tendency to swing around into a tail-first position and so must be restrained against rotation. An object of this invention is to provide a slipper bearing with the ability to run with equally high efficiency in either direction. Another object is to provide symmetrical slippers for a pivoted slipper bearing, which slippers, instead of being held against their own rotation, may be free to spin on their pivots, thereby promoting better lubrication not only of their working faces but also of their pivot surfaces. Another object is to provide slippers for a pivoted slipper bearing which are inherently stable in their ability to form the wedge-shaped films of lubrication upon which they ride. Another object is to provide "underslung" slippers for pivoted slipper bearings. A further object of the invention is to provide means for controlling the flow of oil thru a conduit connecting the working surface with the pivot surface of the slipper by the proper proportioning of the relative areas of the two surfaces.

These and other objects of the invention will be apparent from the following description in connection with the drawing in which:

Fig. 1 is a diagrammatic representation of four types of pivoted slippers, each slipper being shown both in plan view (Figs. 1a, 1b, 1c, and 1d), and in elevational view, the elevational views showing also portions of the pivot structure and the runner on which the slippers operate;

Fig. 2 is a sectional view of a bearing assembly in which pivoted slippers carry thrust load only;

Fig. 3 is a sectional view of a bearing assembly in which pivoted slippers may carry both thrust and radial loading;

Fig. 4 shows a shaft supported on two slipper bearings, one of which is adapted to carry both radial and thrust loads, and the other, radial loads only; and Fig. 5 is an end view of Fig. 4, the bearing housing being in section.

Briefly described, the invention consists in providing a slipper bearing in which each slipper is "underslung", i. e. the slipper is seated in a spherical pivot seat so formed that the center of curvature of the pivot seat is below the working faces of the slipper and of the runner on which the slipper operates. The aptness of the term "underslung" is obvious when it is realized that any spherically pivoted slipper is, in effect, propelled over the runner by a force component acting at the center of curvature of the pivot surfaces, which in this case is below the entire slipper.

The working faces of "underslung" slippers and of the runner may be either plane or spherical, or in other words, the working faces may be spherical with either an infinite or a finite radius of curvature.

The invention consists also in providing, in a pivoted slipper bearing, circular slippers free to spin relative to their pivots to promote good lubrication of the pivot surfaces, and so constructed and arranged that they can operate with equal efficiency with either direction of rotation of the bearing. The invention further consists in providing a pivoted slipper having working and pivot surfaces connected by a conduit thru the slipper, flow of oil thru the conduit being controlled by the proper proportioning of the relative areas of the two surfaces.

Referring to the drawing, in Fig. 1, four types of slippers are shown operably associated with a runner 8 whose motion relative to the slippers is in the direction indicated by the arrow. Thus the right-hand end of each of the slippers may be spoken of as its forward end.

The slippers of Figs. 1a and 1b are not constructed in accordance with the present invention and are included only to illustrate conditions occurring in types of slipper bearings which have been known and used heretofore. In Fig. 1a, slipper 7 runs on runner 8 and is pivoted on spherical pivot 9, the center of curvature of the pivot surface being at point 6a. In Fig. 1b, slipper pad 11 has an integral hemispherical boss 12 pivotally seated in cup 13, the center of curvature of the pivot surface being in the plane of the upper side of pad 11 at point 6b.

In Fig. 1c, slipper 14 is hemispherical, and is pivotally seated in cup 15, the center of curvature of the pivot surface being on the working face of slipper 14 at point 6c.

In Fig. 1d, slipper 16 is formed as a spherical segment, less than half a sphere; in other words, slipper 16 has the form of a plano-convex lens. Slipper 16 is pivotally seated in spherical cup 17, and the center of curvature of its pivot surfaces is below the surface of runner 8 at point 6d. The radius of curvature of cups 17 should preferably be slightly greater than that of the pivot surface of slipper 16. Slipper 16 may have a small hole 18 drilled thru it axially, and the area of the working face may be reduced by peripheral trimming as indicated by bevel 19.

In Fig. 2, slippers 20 of similar type to slippers 16, are pivoted in cups 21 in housing member 22, and support the downward thrust of runner 28 which carries vertical shaft 23, working face 27 of runner 28 coacting with the working faces of slippers 20. The centers of curvature of the pivot surfaces of slippers 20 and cups 21 are beyond the working face 27 of runner 28 approximately at the points 26. Radial loading on shaft 23 is taken by journal bearing 24. Housing member 22 is formed as a receptacle for an oil bath so that slippers 20 and runner 28 may run flooded with oil.

In Fig. 3, slippers 30 are pivoted in spherical cups 31 in housing member 32 which also may contain an oil bath. The centers of the spherical pivot surfaces are at points 36. Slippers 30 are essentially of the same type as slippers 16 and 20, but the working faces of slippers 30 are concavely spherical instead of plane. In other words, slippers 30 have the form of a converging concavo-convex lens. Runner 38 has a spherical working surface coacting with the working faces of slippers 30. The spherical working faces of slippers 30 and of runner 38 center at point 37. Shaft 33 is supported by runner 38.

In Figs. 4 and 5, slippers 40 have concavely spherical faces coacting with ball 48 integral with or fixed upon shaft 45. The concavely spherical faces of slippers 40 center at point 47, the center of ball 48. Slippers 40 are pivoted in spherical cups in housing members 42 and 43, the centers of curvature of the pivot surfaces being at points 46 within ball 48. Slippers 50 have concavely spherical working faces centering at point 57 and coacting with ball 58 which is axially slidable on shaft 45 but keyed against rotation thereon as by key 54. Slippers 50 are pivoted in spherical cups in housing member 52, the centers of curvature of the spherical pivot surfaces being at points 56 within the surface of ball 58.

*Operation.*—In a pivoted slipper bearing, the oil-wedge upon which each slipper rides is usually formed by eccentric loading, as is well-known. For example, in Fig. 1a, the load on slipper 7 would be applied thru pivot 9, the line of action of the load passing thru the center of the pivot, point 6a, and thru the working face of the slipper at a point about 0.6 of its length from the leading end. As long as the effective center of pressure in the oil film, which may be originally at the center of the slipper, is forward of the pivot, the load will produce a moment tending to tilt the slipper anti-clockwise, raising the leading edge. As the slipper tilts, the effective center of pressure in the oil film shifts to the rear, until equilibrium is reached with the slipper riding on a wedge of oil. Opposed to the moment of the load, is that due to the friction force which is normally very small, but whose moment arm about the center of pivot 9 is several times as great as the moment arm of the load. The friction force operates to the left along the working face of slipper 7 and tends to turn slipper 7 clockwise about point 6a.

If for any reason, the friction should increase, the preponderance of the moment producing the desired tilt would be reduced, and it is obvious that the condition tends to be unstable in that increase of friction will reduce the wedge thickness and thereby increase friction still further. (In practice, the type of pivot shown in Fig. 1a is seldom used. Instead, the pivot consists of a point or line contact and the slipper is driven by a stationary lug behind the pad portion of the slipper, near the working face.)

In Fig. 1b, the friction moment operating on slipper 11 is less than that operating on slipper 7 in Fig. 1a because its moment arm is less, the pivot center 6b of slipper 11 being much nearer to the working face of the slipper. Otherwise, conditions in the two cases are similar. Both slippers 7 and 11 must be positively restrained from swinging around tail-first by suitable well-known means not shown, and bearings constructed with slippers of these types are essentially irreversible in operation. While they will function in reverse, it is only with reduced efficiency.

Another undesirable characteristic of slipper 11 for thrust bearing service is the tendency of the oil to squeeze out from between the spherical pivot surfaces because there is little or no relative movement between the parts in service. As a result, the friction in the pivot is too high to permit slipper 11 to tilt freely for efficient oil-wedge formation to suit changing speeds and loads, and slipper 11 tends to "bed in", the pivot surfaces becoming seized or abraded.

In Fig. 1c slipper 14 is hemispherical; consequently both the load and the frictional force act thru the center of the working face, point 6c, and therefore neither has any moment tending to tilt the slipper. Yet a slipper of this type will operate with fairly satisfactory efficiency if the periphery of the working face be beveled slightly. The bevel together with the increase in temperature of the oil while passing thru the film, tend to shift the effective center of pressure forward of the center, producing the desired moment to tilt the slipper and form the desired oil-wedge. However, the wedge would ordinarily be thinner and the efficiency lower than with eccentrically loaded slippers. Slipper 14, being symmetrical, needs no restraint against its own rotation and can be permitted to rotate at will. A bearing using hemispherical slippers 14 would be reversible, and would run as well in reverse as in the forward direction.

In the series of slippers shown in Fig. 1, the several pivot centers 6 are progressively lower from A to D until at D, slipper 16 has its pivot center 6d well below the surface of runner 8. Slipper 16 may aptly be said to be "underslung" because the effective driving force on the slipper, by which it is propelled along the runner, while applied by pivot cup 17, acts as tho applied to the right thru the pivot center. This force is equal and opposite in direction to the friction force of the runner on the working face of the slipper, and the two forces form a couple tending to tilt the slipper in the manner desired for oil-wedge formation. Ordinarily the friction forces are small, but the moment arm of the couple can be made as large as desired by proper choice of proportions, so that in practice, the "underslung" slipper need be no less efficient than the eccentrically loaded slipper. Even if proportioned to run on a thinner wedge than would be safe with the eccentrically loaded slipper, the operation of the "underslung" slipper is stable, for if, for any reason, the friction should be abnormally high, it acts with correspondingly greater force to correct the condition and increase the efficiency by tilting the slipper to form a thicker oil-wedge.

Slipper 16, being symmetrical, may be left free to rotate at will. While no mathematical treatment has yet been worked out for conditions in the oil film under a round slipper free to rotate, free rotation is obviously advantageous not only in tending to equalize the effective velocity of all parts of the slipper relative to the runner and in producing higher efficiency by promoting the optimum inclination and direction of the oil-wedge, but also in improving the lubrication of the pivot surfaces. Relative motion is required to maintain film lubrication between bearing surfaces, and spinning of the slipper in its cup will obviously produce better lubrication of the pivot surfaces than if there were practically no relative motion. As a further aid, provision may be made to insure a supply of oil at the center of cup 17, as by hole 18 thru slipper 16, together with the proper adjustment of the area of the working face relative to the area of the pivot surfaces by a suitable bevel 19, to secure the right pressure relationship at the two surfaces of the slipper. In order for oil to flow upward thru hole 18, pressure at its lower end must be higher than that at its upper end; to promote this condition, the area of the working face of slipper 16 should be less than the projected area of cup 17 so that the average specific pressure in the film at the working face may be greater than that in the film in cup 17. In this manner, complete oil film lubrication may be obtained on both sides of slipper 16, so that the slipper practically floats in an envelope of lubricant.

Slipper 16 is plane-faced, adapted to coact with a plane-faced runner. All of the advantages of slipper 16 would be present in even greater measure if the working face were spherical, the runner surface being also spherical. For most purposes, this is the preferred form of the invention, the slippers having the form of a converging concavo-convex lens and coacting with a spherical runner surface.

Figs. 2 to 5 inclusive show applications of "underslung" slippers, both plane- and spherically-faced, constructed in accordance with the invention.

In Fig. 2, slippers 20 are "underslung" in that the centers of curvature 26 of their pivot surfaces are beyond the working surface 27 of runner 28. Each slipper 20 is free to adjust itself for maximum efficiency in every way, and the friction moment tends to increase the thickness of the oil-wedge thereby reducing the amount of friction. During operation of the bearing, slipper 20 will rotate or spin in its cup 21 because of the higher velocity of the peripheral portion of runner 28 relative to that of its inner portion. The spinning of slipper 20 is helpful in maintaining proper oil film lubrication between the pivot surfaces, to keep them in good condition and to provide free pivoting action. Whatever the exact resultant direction of oil flow under slipper 20, it is free to and will adapt itself to that flow which will give maximum efficiency, and because the friction moment tends to reduce friction, conditions are stable.

The bearing of Fig. 2 may be criticized in that absolute accuracy would be necessary for its practical operation unless some self-aligning and load-equalizing features were provided. The bearing of Fig. 3 is not subject to such criticisms. If slippers 30 are three in number, the bearing of Fig. 3 is completely self-aligning and the three slippers 30 share the entire thrust load equally between them. Moreover, no journal steady bearing is needed, for slippers 30 can carry considerable radial loading also. Slippers 30 are free to rotate on their own axes, and adjust themselves at will for maximum efficiency and the proper lubrication of the pivot surfaces as well as of the spherical working surfaces. Slippers 30 may be provided with axial holes like hole 18 in slipper 16 if desired. Being "underslung", with the centers of curvature 36 of their pivots well beyond the working face of runner 38, the frictional forces tend to increase the thickness of the oil-wedges, thereby reducing the friction, and all operating conditions work together to promote efficient and stable operation with film lubrication on both working faces and pivot surfaces of the slippers.

The operation of the bearings shown in Figs. 4 and 5 is obvious. Ball 48 is fixed on shaft 45 and slippers 40 are so located that they can take not only radial loads, but also thrust in either direction, locating shaft 45 axially. Slippers 50 coact with ball 58 which is axially free on shaft 45. Slippers 50, therefore, take radial load only. Both slippers 40 and 50 are "underslung", the centers of curvature, 46 and 56 respectively, of their pivots being well within the surfaces of balls 48 and 58 respectively. Slippers 40 and 50 are free to spin on their own axes at will, but slippers 50 have no tendency to spin unless housing member 52 should be set at an angle not normal to shaft 45.

Having thus described the invention, it is obvious that all the objects thereof, as stated, have been attained in a simple and efficient manner. While specific applications of the invention have been shown and described, it will be understood that other applications, and changes in the arrangement and construction of the invention, may be made without departing from the spirit or scope of the invention as expressed in the following claims.

I claim:

1. In a pivoted slipper bearing, a slipper circular in plan view and shaped like a converging lens with a spherical pivot surface on one side and a working surface on the other, the maximum thickness between said surfaces being substantially less than the radius of curvature of said spherical pivot surface, said slipper in combination with a pivot comprising a spherical socket operably conforming to said spherical pivot surface, and a runner having a working face operably conforming to the working surface of said slipper, said slipper being free both to tilt and to spin in said socket.

2. In a pivoted slipper bearing, a slipper circular in plan view and shaped like a converging lens with a spherical back, a maximum thickness less than the radius of curvature of said spherical back, and a spherical working face whose radius of curvature is greater than that of said spherical back, said slipper in combination with a pivot comprising a spherical socket operably conforming to said spherical back, and a runner having a spherical working face operably conforming to the working face of said slipper said slipper being free both to tilt for oil film lubrication with said runner and to spin about the slipper axis to promote film lubrication in said socket.

3. A self-centering thrust bearing comprising a spherically-faced runner, slippers each formed like a converging concavo-convex lens with a working face operably conforming to the spherical face of said runner and with a spherical pivot surface of smaller radius of curvature than that of said working face, the maximum thickness of the slippers being less than the said smaller radius, a housing member, and sockets in said housing member and operably conforming to the pivot surfaces of said slippers.

4. A radio-thrust bearing comprising a shaft, a runner fixed thereon and having a spherical working surface, slippers positioned on both sides of the center of said spherical working surface so as to carry both radial and thrust loads in all directions, concave working faces on said slippers operably conforming to the working surface of said runner, pivot surfaces on said slippers also spherical but of smaller radius of curvature than said working faces, the maximum thickness of the slippers being less than the said smaller radius, a housing member, and sockets in said housing member and operably conforming to the pivot surfaces of said slippers.

5. In a slipper bearing, in combination, slippers circular in plan view and having the form of a plano-convex lens of maximum thickness less than the radius of curvature of the convex surface thereof, a runner having a plane working face operably associated with and conforming to the plane faces of said slippers, and pivot cups operably associated with and conforming to the convex surfaces of said slippers, said slippers being free both to tilt for oil-wedge formation and to spin to assist lubrication in said pivot cups.

6. In a slipper bearing, in combination, slippers circular in plan view and having the form of a concavo-convex lens of maximum thickness less than the radius of curvature of the convex surface thereof, a runner having a spherical working face operably associated with and conforming to the concave faces of said slippers, and pivot cups operably associated with and conforming to the convex surfaces of said slippers, said slippers being free both to tilt for oil film lubrication with said runner and to spin to promote oil film lubrication in said pivot cups.

7. In a pivoted slipper bearing, in combination, a runner, a working surface on said runner, a casing member, a spherical pivot seat in said casing member, a slipper spherically pivoted in said seat and operably associated with said working surface, the center of curvature of said spherical pivot seat being beyond said working surface from said seat, said bearing so constructed and arranged as to permit said slipper both to tilt and to swivel in said seat, and an oil bath in said casing member submerging said slipper and associated parts.

8. A pivoted slipper bearing comprising a runner, a working surface on said runner, a casing member, a slipper having a face operably conforming to said working surface, a spherical pivot seat for said slipper in said casing member, said slipper being free both to tilt and to spin in its seat, and means for insuring that the friction force operable along the working face of said slipper shall tend to tilt the slipper in the direction desired to increase the thickness of the oil-wedge between said slipper and said runner working surface, said means comprising the construction and arrangement of said slipper and seat with the center of curvature of said spherical pivot seat beyond said working surface from said slipper.

9. A pivoted slipper bearing comprising a runner, a working face on said runner, a casing, a spherical socket in said casing with its center of curvature beyond said working face from said socket, a slipper circular in plan view, a working face on said slipper operably conforming to said runner working face, a spherical surface on said slipper operably conforming to said spherical socket, said slipper being free both to tilt for oil film lubrication with said runner and to spin about its axis to promote oil film lubrication in said socket, and means for feeding oil into said spherical socket, said means comprising an oil bath in said casing submerging said slipper, a hole thru said slipper from its working face to its spherical pivot surface, and means for producing higher specific oil pressure at the working face end of said hole than at the pivot surface end thereof.

10. A pivoted slipper bearing comprising a slipper circular in plan view and shaped like a converging lens with a spherical pivot surface on one side and a working surface on the other, the maximum thickness between said surfaces being substantially less than the radius of curvature of said spherical pivot surface, a pivot comprising a spherical socket conforming to the spherical pivot surface of said slipper, and a runner having a working face conforming to the working surface of said slipper, said slipper being free both to tilt for oil film lubrication with said runner and to spin about its axis to promote film lubrication in said socket, the area of the oil film between said slipper and said runner being less than the projected area of the oil film between said slipper and said spherical socket thereby making the average specific pressure in the former oil film greater than that in the latter, and a hole thru said slipper connecting said oil films to assist in the lubrication of said pivot surfaces.

EDWIN S. HALL.